May 12, 1931.    G. F. ATWOOD    1,805,229
VARIABLE ELECTRICAL APPARATUS
Filed Aug. 28, 1926    2 Sheets-Sheet 1
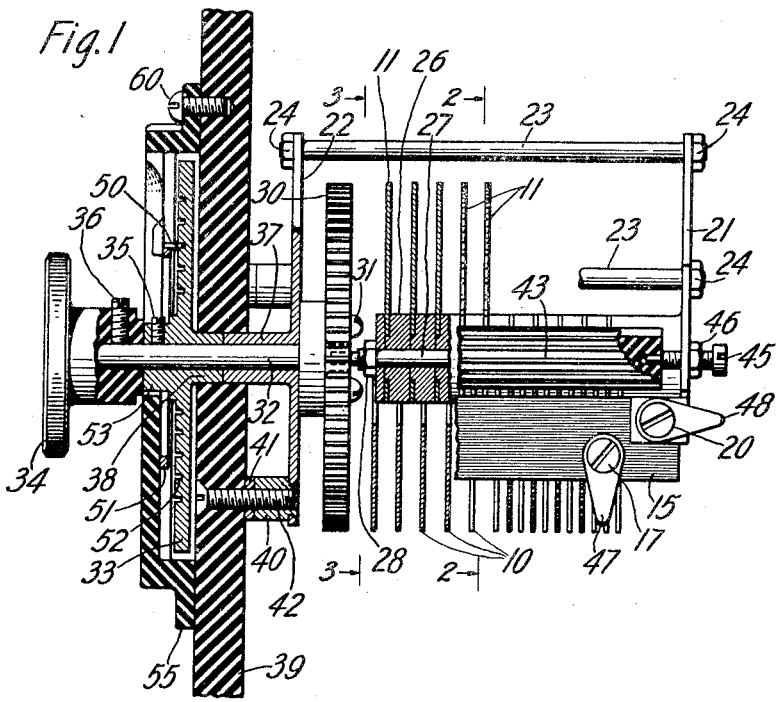
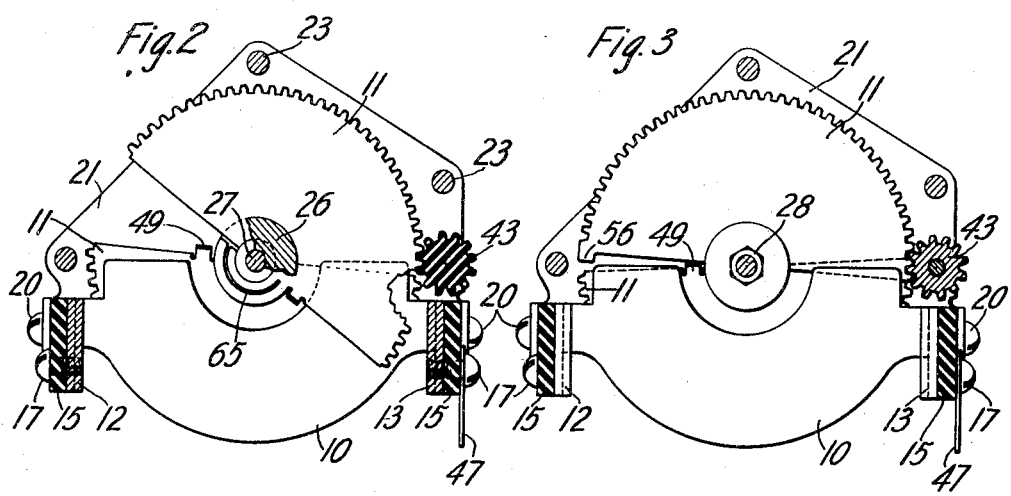
Inventor:
George F. Atwood,
by
Attorney.

May 12, 1931.  G. F. ATWOOD  1,805,229
VARIABLE ELECTRICAL APPARATUS
Filed Aug. 28, 1926  2 Sheets-Sheet 2
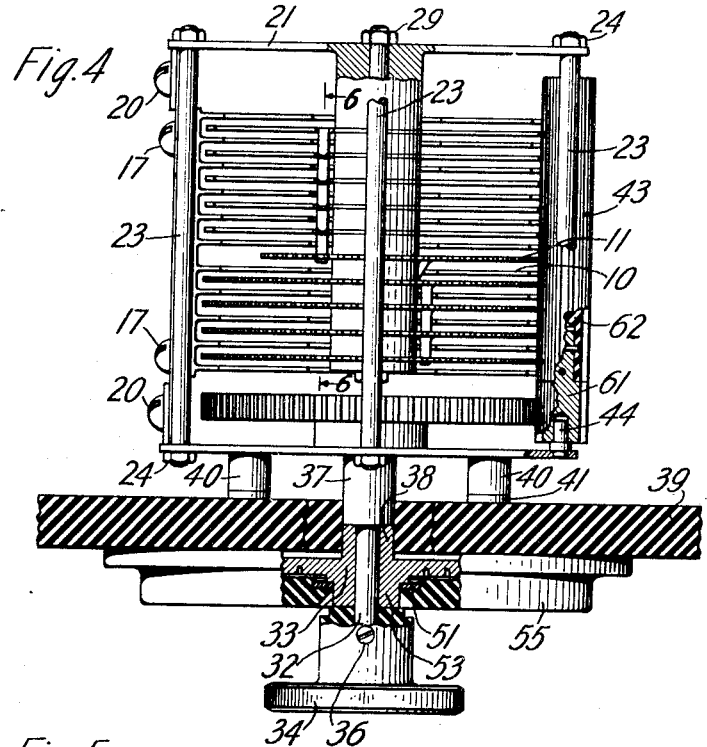
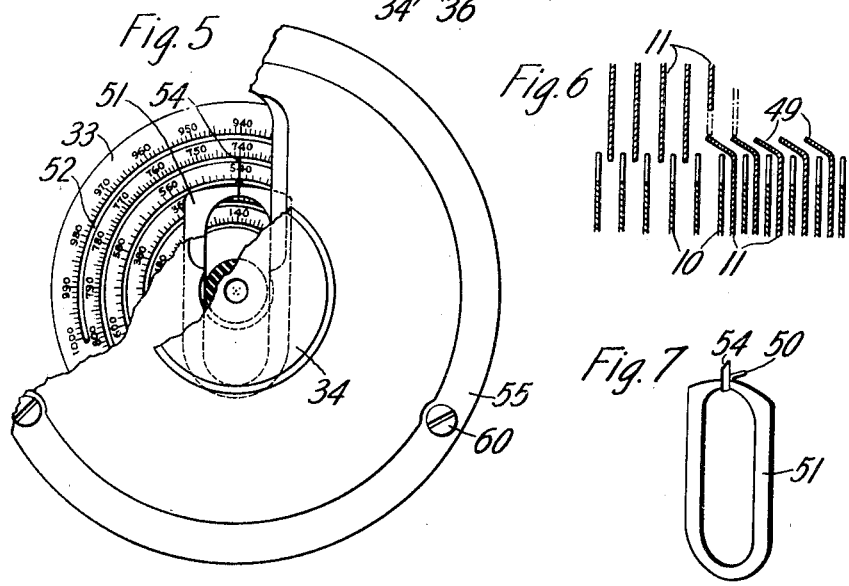
Inventor:
George F. Atwood,
by *[signature]*
Attorney.

Patented May 12, 1931

1,805,229

UNITED STATES PATENT OFFICE

GEORGE F. ATWOOD, OF NEWARK, NEW JERSEY, ASSIGNOR TO BELL TELEPHONE LABORATORIES, INCORPORATED, OF NEW YORK, N. Y., A CORPORATION OF NEW YORK

VARIABLE ELECTRICAL APPARATUS

Application filed August 28, 1926. Serial No. 132,080.

This invention relates to variable electrical apparatus and particularly to adjustable impedances, such as condensers which may be varied by changing the position of their movable elements.

An object of the invention is to provide for an increase of the ratio of the displacement of the controlling means of a variable electrical device to the resulting change in its electrical characteristics, whereby accurate settings may be made.

Another object is to provide for an indication of the settings of a variable electrical device in which the displacement of the controlling means is relatively large compared to the resulting change in the electrical characteristics of the device.

In designing condensers it has been the practice to employ a set of spaced fixed plates and a set of spaced movable plates which may be moved as a unit into operative alignment with the fixed plates. One method of obtaining a fine adjustment in such a condenser is to employ a single additional movable plate which may be separately operated after the coarse adjustment has been made by revolving the set of movable plates. Another arrangement commonly used for obtaining fine adjustment is to employ a reduction gear whereby a large angular movement of the rotating means produces a small rotation of the plates. The arrangement employing the single separatively controlled plate is unsatisfactory since it involves the use of two separate scales to obtain an accurate indication of the setting. A disadvantage of the second method is that the scale becomes so restricted that small changes in setting cannot be conveniently read.

In accordance with the embodiment of the invention which is herein shown and described for the purpose of illustration, a variable condenser is provided with a plurality of spaced stationary plates and a plurality of spaced movable plates so arranged that the latter may be consecutively interposed between adjacent stationary plates.

In order to obtain a fine capacity adjustment, the condenser is preferably so designed that a relatively large movement of the capacity controlling means is required to change the capacity of the condenser by a relatively small proportion of its maximum value. To accurately indicate the setting of such a condenser, there is provided a scale having a curved, grooved portion in which an indicator moves, this scale member being secured to the capacity controlling means and revolving therewith. Such a scale member will function for any capacity setting and for any rotation of the capacity controlling means.

The invention may be better understood by referring to the accompanying drawings in which, Fig. 1 is a plan view, partly in section, of a variable electro-static condenser constructed in accordance with this invention.

Fig. 2 is a sectional view of Fig. 1 taken along the line 2—2 of Fig. 1.

Fig. 3 is a sectional view taken along the line 3—3 of Fig. 1 for a position of the condenser plates different from that shown in Fig. 1.

Fig. 4 is a rear view partly in section.

Fig. 5 is an end view partly in section.

Fig. 6 is a detail sectional view taken along the line 6—6 of Fig. 4, showing the alignment of the condenser plates.

Fig. 7 is a perspective view of the indicator which is employed to show the setting of the condenser.

The condenser comprises essentially the metallic supporting plates 21 and 22, held in position by the partly threaded rods 23 and the nuts 24, and the stationary and movable metallic condenser plates 10 and 11, respectively, which are positioned in parallel spaced planes. The stationary plates 10 are secured to the metallic supporting members 12 and 13 which are fastened to the insulating blocks 15 by means of screws 17. The insulating blocks 15 are secured by means of screw 20 to the supporting plates 21 and 22. The movable plates 11 and the spacing washers 26 are mounted on the shaft 27, on one end of which the nut 28 is threaded and the other end of which passes through the supporting plate 21 to which the shaft is secured by means of the nut 29.

The end of shaft 27 projects slightly beyond the nut 28 and fits into a hole in the gear wheel 30 which is made of insulating material. The gear wheel 30 is secured by means of screws 31 to the enlarged end portion of shaft 32, near the other end of which are secured the scale member 33 and the knob 34 by means of the screws 35 and 36, respectively. The hub portions 37 and 38 of the supporting plate 22 and the scale member 33 respectively fit into a hole in the panel 39, the hub portion 37 serving as a bearing for the shaft 32. The condenser structure is secured to the panel 39 by means of the screws 42 which pass through the spacing washers 41 into the internally threaded bosses 40, secured to the supporting plate 22. The pinion gear 43 comprises a metallic portion 61 and a fibre portion 62. The metallic portion 61 of the pinion gear, which is in mesh with the gear wheel 30, is supported by the pin 44 secured to the supporting plate 22 and the adjustable screw 45 which threads into the supporting plate 21 and is secured to the plate by the nut 46. The peripheral portions of the movable plates 11 are provided with gear teeth which are adapted to mesh with the fibre portion 62 of the pinion gear 43.

The terminal lug 47 is secured to the insulating block 15 by the screw 17, which threads into the supporting member 13, and is thereby electrically connected to the stationary plates 10. The terminal lug 48 is secured to the projecting portion of the supporting plate 21 by means of the screw 19 and is thereby electrically connected to the movable plates 11. Each of the movable plates is provided with a projecting portion 49 (see page 6) which extends beyond the plate and is bent over so as to come into the path of the adjacent movable plate. The end movable plates, that is the movable plates which are nearest to the gear wheel 30 and the supporting plate 21, respectively, are provided with a stop 56 which prevents the end movable plates from being moved out of mesh with the pinion gear 43 when the condenser is set for maximum or minimum capacity.

Each of the movable plates 11, as shown in Fig. 2, is provided with a split portion 65 which is in contact with the spacing washers 26 and which is bent slightly out of the plane of the plate, thereby forming a spring or frictional contact with washers 26. This contact serves both to maintain the plates in a desired position when out of mesh with the pinion gear and to provide a low resistance, non-microphonic electrical connection between the plates 11 and the shaft 27. Because of the large bearing surface of the plates and the relatively small contact pressure employed at this surface, wear of the moving parts is reduced to a minimum. For this reason and also because only that portion of the charging current which flows to the plate being moved passes through the frictional contact, rather than the total charging current for all of the plates, changes of potential caused by changes in resistance of the frictional contact are small.

The scale member 33 consists of a disc having a spiral groove 52 along which there are suitable scale markings. The indicator 51 consists of a substantially rectangular shaped member having a rectangular opening of sufficient width to fit about the collar 53 of the scale member 33 and having a pin 50 and a pointer 54 secured at one end. As the scale member 33 is revolved with the shaft 32, the indicator 51 slides along a groove in the face plate 55, secured to panel 39 by screws 60 as the pin 50 moves along the spiral groove 52.

To understand the operation of this device, let us first consider the condenser set for maximum capacity, that is, with all of its movable plates positioned between the stationary plates. In order to decrease the capacity of the condenser the knob 34 is turned in a counter-clockwise direction as viewed in Fig. 5, thus causing the rotation of gear wheel 30 in the same direction. Since the gear wheel 30 and the first movable plate 11, that is, the movable plate nearest to the gear wheel 30, are both in mesh with the pinion gear 43, the counter-clockwise rotation of gear wheel 30 causes the rotation of the first movable plate 11 in the same direction. When this plate has been displaced an angle of nearly 180° from its original position, and when it is about to move out of mesh with the pinion gear, it impinges against the lug 49 of the second movable plate 11 thus moving the second plate into mesh with the pinion gear 43 as shown in Fig. 3. In the same way each of the remaining movable plates, as it is moved out of mesh with the pinion gear, impinges upon the projecting lug of an adjacent movable plate to move the latter into mesh with the pinion gear. The friction between the spacing washers 26 and the movable plate 11, which is due to the split portion 65 of plates 11 or any other spring arrangement which may be employed, serves to maintain the plates in position when out of mesh with the pinion gear. When the condenser is set for minimum capacity, the end plate nearest to the supporting plate 21 is prevented from being moved out of mesh with the pinion gear by a stop similar to the stop 56 shown in Fig. 3. While the capacity of the condenser is being changed from maximum to minimum, the indicator 51 slides along the groove in face-plate 55, so that the pin 50 and the pointer 51 of the indicator move along the spiral groove 52 of the scale member 33 from its peripheral portion towards its center, indicating at all times the setting of the condenser in micro-farads or in other convenient units.

It is to be understood that this invention is not limited to a variable condenser but includes any device, such as a variometer, the electrical characteristics of which are capable of being varied by the displacement of its movable elements. Instead of employing a scale member in the form of a disc having a spiral groove, a differently shaped scale member may be employed as for example, a cylinder having a helical groove.

What is claimed is:

1. In a variable condenser, a plurality of stationary plates, a plurality of movable plates insulated from said stationary plates and having gear teeth at a peripheral portion, a pinion gear in mesh with the gear teeth of one of said movable plates, means for revolving said pinion gear to move one of said movable plates between adjacent stationary plates, and means for positioning a second of said movable plates into mesh with said pinion gear as said first mentioned movable plate is moved out of mesh with said pinion gear.

2. In a variable condenser, a plurality of stationary plates, a plurality of movable plates, said movable plates being in planes parallel to but displaced from the planes of said stationary plates and having gear teeth at their peripheral portions, a pinion gear in mesh with the gear teeth of one of said movable plates, a knob and a gear wheel secured to a shaft, said gear wheel being in mesh with said pinion gear, said movable plates being adapted to be consecutively positioned into operative alignment with said stationary plates by turning said knob, a projecting portion forming a part of each of said movable plates so that as one plate is moved out of mesh with said pinion gear the projecting portion of said plate impinges upon a second movable plate to move it into alignment with said pinion gear.

3. In an adjustable electrical device, a plurality of stationary plates, a plurality of movable plates, gear teeth on said movable plates, a pinion gear meshing with the gear teeth on one of said movable plates, means for actuating said pinion gear to rotate one of said movable plates, and means for meshing a second of said movable plates with said pinion gear when said first movable plate has reached the limit of its travel.

4. In an adjustable electrical device, a plurality of stationary plates, a plurality of movable plates, gear teeth on said movable plates, a pinion gear meshing with the gear teeth on one of said movable plates, a shaft and gear for actuating said pinion gear to rotate one of said movable plates, means for meshing a second of said movable plates with said pinion gear when said first movable plate has reached the limit of its travel, a scale member secured to said shaft and having a spiral groove therein, scale markings on said scale member along said groove, a pointer, a slidable mounting therefor, said pointer moving over successive parts of the groove as each plate is successively rotated into and out of engagement with the pinion.

5. In an adjustable electrical device, a plurality of adjacently located movable elements, a manually operated driving member therefor, one of said elements being normally coupled thereto, and means on each element rendered operative as it reaches its limit of travel and disengages itself therefrom to engage the adjacent movable element and couple it to said driving member.

6. In a variable condenser, a stator, a rotor comprising a shaft having a number of plates individually movable thereon, a manually operated driving member for individually moving said plates, one of said plates being normally in operative relation to said driving member, means on each plate rendered active as it disengages itself from said driving means as it reaches the limit of its travel to engage the adjacent plate and couple it to said driving element.

7. In an adjustable electrical device, a plurality of adjacently located movable elements, a manually operated driving member therefor, one of said elements being normally coupled thereto, means on each element rendered operative as it reaches its limit of travel and disengages itself therefrom to engage the adjacent movable element and couple it to said driving member, a shaft and gear for said driving member, a scale member secured to said shaft and having a groove therein, scale markings on said scale member along said groove, a pointer, a slidable mounting therefor, said pointer moving over successive parts of said groove as each plate is successively rotated into and out of engagement with said driving member.

In witness whereof, I hereunto subscribe my name this 21st day of August, A. D. 1926.

GEORGE F. ATWOOD.